United States Patent
Kataoka et al.

(10) Patent No.: US 6,463,095 B1
(45) Date of Patent: *Oct. 8, 2002

(54) IC CARD RADIO MODEM AND COMMUNICATION SYSTEM USING THE SAME FOR COMMUNICATING WITH A PLURALITY OF DIFFERENT INFRASTRUCTURES

(75) Inventors: Kenji Kataoka; Kohei Nishiyama, both of Tokyo (JP)

(73) Assignee: NEC Corporation (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 80 days.

(21) Appl. No.: 08/782,741

(22) Filed: Jan. 13, 1997

Related U.S. Application Data

(63) Continuation of application No. 08/364,257, filed on Dec. 27, 1994, now abandoned.

(30) Foreign Application Priority Data

Dec. 28, 1993 (JP) .............................................. 5-335171

(51) Int. Cl.[7] .............................................. H04L 27/10
(52) U.S. Cl. ........................ 375/223; 375/219; 455/556; 455/575
(58) Field of Search ................................. 375/223, 219, 375/220, 222, 216, 221; 455/89, 90, 347, 349, 351, 186, 426, 462, 554, 555, 556, 553, 525

(56) References Cited

U.S. PATENT DOCUMENTS

| | | | | |
|---|---|---|---|---|
| 5,109,540 A | * | 4/1992 | Dzung et al. | 455/89 |
| 5,302,947 A | * | 4/1994 | Fuller et al. | 340/825.34 |
| 5,471,471 A | * | 11/1995 | Freeburg et al. | 370/79 |
| 5,524,007 A | * | 6/1996 | White et al. | 370/85.11 |
| 5,628,055 A | * | 5/1997 | Stein | 455/89 |

FOREIGN PATENT DOCUMENTS

| | | |
|---|---|---|
| JP | 2268390 | 11/1990 |
| WO | 94 13610 | 7/1993 |
| WO | 94 10774 | 5/1994 |
| WO | 94 21058 | 9/1994 |

* cited by examiner

Primary Examiner—William Luther

(57) ABSTRACT

An IC card radio modem includes an IC card unit storing infrastructure type information in a memory, a plurality of infrastructure-compatible units connected to the IC card unit at multiple points through an IC card interface, and an antenna for sending information to a designated external infrastructure. The present invention also relates to a communication system using the IC card radio modem.

9 Claims, 6 Drawing Sheets

IC CARD RADIO MODEM AND COMMUNICATION SYSTEM USING THE SAME FOR COMMUNICATING WITH A PLURALITY OF DIFFERENT INFRASTRUCTURES

This is a continuation of application Ser. No. 08/364,257 filed on Dec. 27, 1994, now abandoned.

BACKGROUND OF THE INVENTION

1. Field of the Invention

The present invention relates to an IC card radio modem usable in combination with a plurality of infrastructure-compatible units and a communication system using this modem and, more particularly, to an IC card radio modem which accommodates a plurality of connectable infrastructure-compatible units in a single dedicated package (modem main body) to realize communication with an infrastructure network which is arbitrarily selected from an IC card unit side, and a communication system using this modem.

2. Description of the Prior Art

A conventional IC card radio modem of this type has a structure in which an IC card unit and an infrastructure-compatible unit compatible with a single infrastructure network form a pair (set) inside or outside the card, as disclosed in, e.g., Japanese Unexamined Patent Publication No. 2-268390.

In the above-described conventional IC card radio modem, the IC card main body and the infrastructure-compatible unit are paired. For this reason, if a system unit accommodating and using an IC card radio modem performs communication through a different network, the IC card radio modem must be exchanged for one corresponding to the type of the infrastructure network for communication. Therefore, the conventional IC card radio modem cannot cope with a requirement for communication with an arbitrary infrastructure network in accordance with command control or the like from the system unit.

SUMMARY OF THE INVENTION

The present invention has been made in consideration of the above situation in the prior art, and has as its object to provide an IC card radio modem which allows data communication with one infrastructure arbitrarily selected from a plurality of infrastructures by using the IC card radio modem in the same system unit without exchanging the IC card, and a communication system using this modem.

In order to achieve the above object, according to the first aspect of the present invention, there is provided an IC card radio modem comprising an IC card unit storing infrastructure type information in a memory, a plurality of infrastructure-compatible units connected to the IC card unit at multiple points through an IC card interface, and an antenna for sending information to a designated external infrastructure.

According to the second aspect of the present invention, there is provided an IC card radio modem wherein the plurality of infrastructure-compatible units according to the first aspect are accommodated in a modem main body incorporating the antenna and having a slot for receiving the IC card unit.

The IC card unit according to any one of the first and second aspects is constituted by a PCMCIA interface, an IC card controller, connected to the PCMCIA interface, for controlling an entire IC card, the memory connected to the IC card controller, and an infrastructure-compatible interface connected to the IC card controller. In addition, each of the plurality of infrastructure-compatible units is constituted by an IC card interface connected to the IC card unit and connection-controlled by predetermined control procedures, an infrastructure-compatible controller connected to the IC card interface, and an infrastructure network-compatible interface connected to the infrastructure-compatible unit.

According to the third aspect of the present invention, there is provided a communication system using an IC card radio modem, comprising an IC card unit storing infrastructure type information in a memory, a system unit, connected to the IC card unit through an interface having an interface function based on a PCMCIA standard, for inputting a command related to a start of data communication and designation of a to-be-used infrastructure, and a plurality of infrastructure-compatible units connected to the IC card unit at multiple points through an IC card interface, wherein communication through an arbitrary infrastructure-compatible unit selected from the IC card unit side is allowed.

According to the fourth aspect of the present invention, there is provided a communication system wherein the plurality of infrastructure-compatible units according to the third aspect are accommodated in a modem main body incorporating the antenna and having a slot for receiving the IC card unit.

The IC card unit according to any one of the third and fourth aspects is constituted by a PCMCIA interface, an IC card controller, connected to the PCMCIA interface, for controlling an entire IC card, the memory connected to the IC card controller, and an infrastructure-compatible interface connected to the IC card controller. In addition, each of the plurality of infrastructure-compatible units is constituted by an IC card interface connected to the IC card unit and connection-controlled by predetermined control procedures, an infrastructure-compatible controller connected to the IC card interface, and an infrastructure network-compatible interface connected to the infrastructure-compatible unit.

As described above, the IC card radio modem of the present invention has an IC card unit accommodated in a system unit and a plurality of infrastructure-compatible units corresponding to different infrastructure network as a radio modem. The infrastructure-compatible unit to be used for data communication can be switched in accordance with to-be-used infrastructure designation information from the system unit without exchanging the IC card which has been mounted in the system unit, thereby smoothly performing data communication through a radio channel.

The above and many other advantages, features and additional objects of the present invention will become manifest to those versed in the art upon making reference to the following detailed description and accompanying drawings in which preferred structural embodiments incorporating the principles of the present invention are shown by way of illustrative example.

DETAILED DESCRIPTION OF THE PREFERRED EMBODIMENTS

The present invention will be described in more detail with reference to an embodiment shown in the accompanying drawings.

Figure 1:
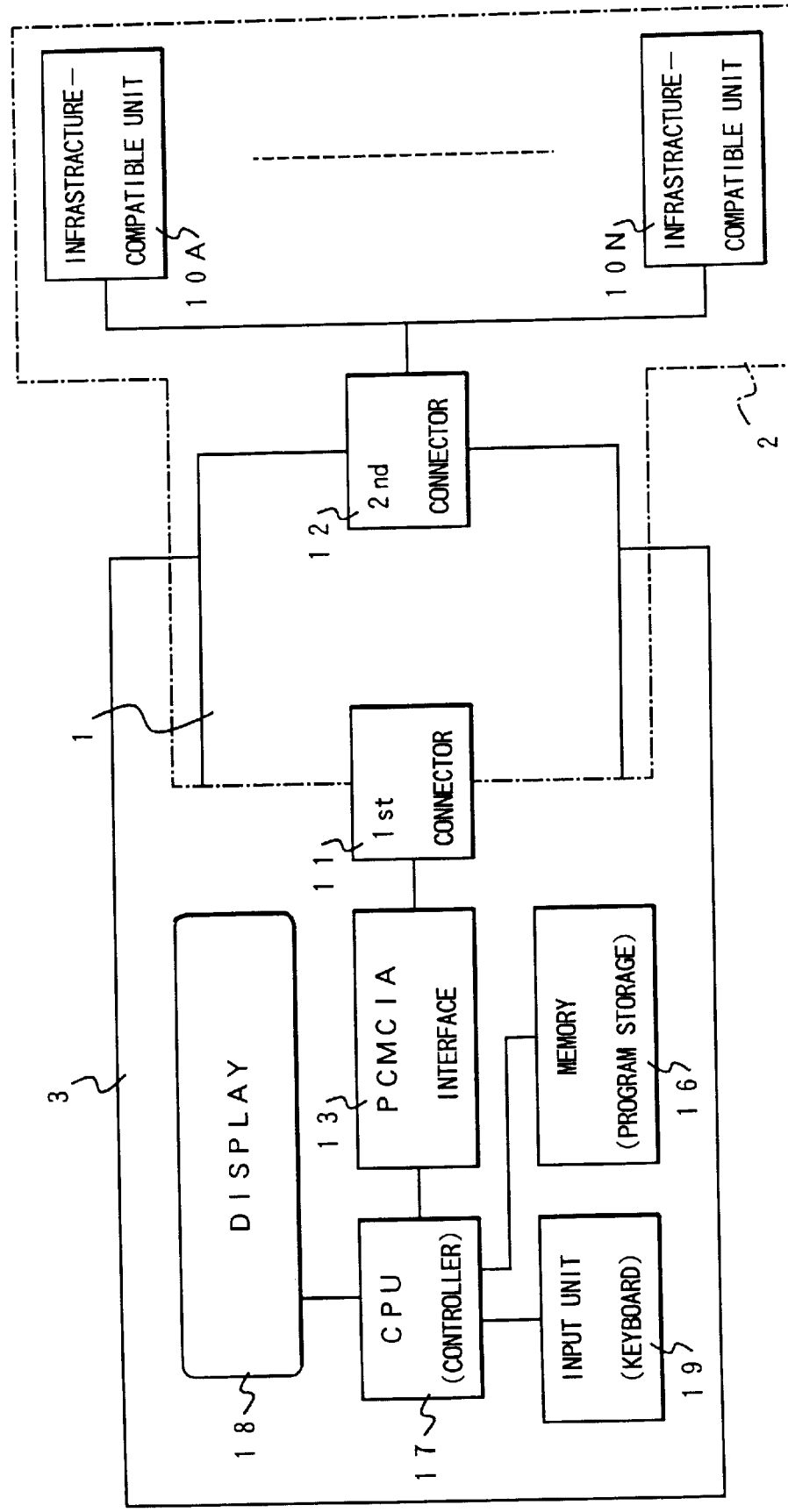
FIG. 1 is a block diagram showing the entire arrangement of an embodiment related to a communication system of the present invention.

FIG. 1 is a block diagram showing an embodiment of the present invention related to a communication system using an IC card radio modem 2. FIG. 1 also shows a detailed example of the IC card radio modem 2 constituted by actually connecting an IC card unit 1 and a plurality of infrastructure-compatible units 10A to 10N to each other.

More specifically, one side of the IC card unit 1 is accommodated in a system unit (e.g., a personal computer) 3 having an IC card insertion slot so as to be connected to the system unit 3. At the same time, the other side of the IC card unit 1 can be connected to the plurality of different infrastructure-compatible units 10A to 10N. These infrastructure-compatible units are constituted to be compatible with various infrastructure networks as a radio modem, as a matter of course.

As a detailed structure of the IC card radio modem 2, the single IC card unit 1 is inserted into an insertion slot portion formed in a package (modem main body) accommodating the plurality of infrastructure-compatible units 10A to 10N and an antenna such that multipoint connection between the single IC card unit 1 and the plurality of infrastructure-compatible units 10A to 10N is achieved. Multipoint connection may be achieved simply by a connector cable or the like.

Figure 2:
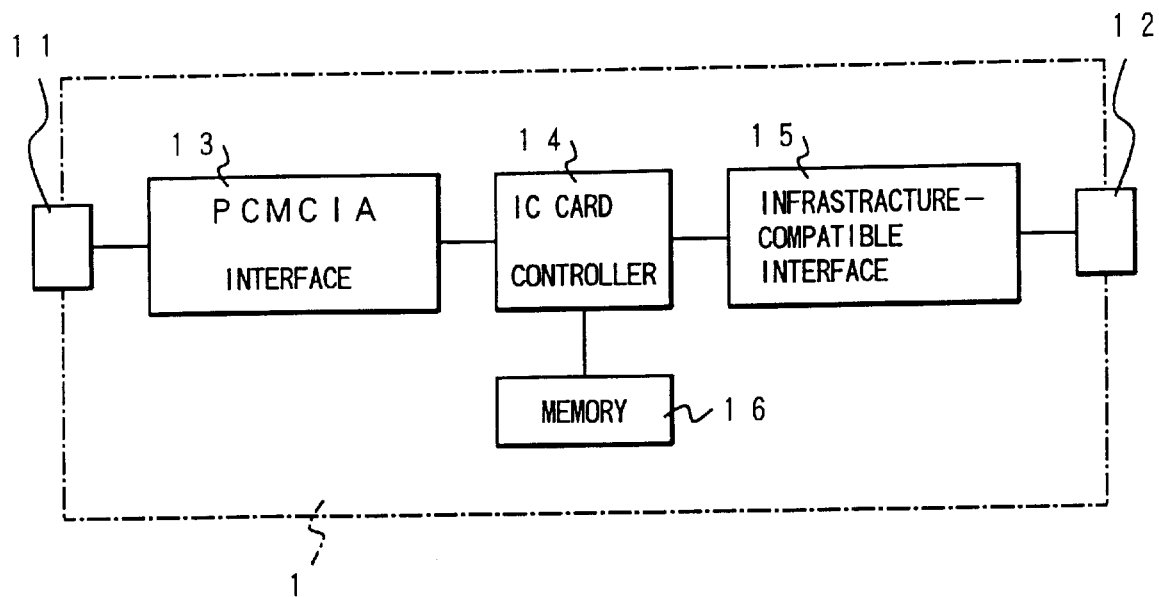
FIG. 2 is a block diagram showing the arrangement of an IC card unit.

FIG. 2 is a block diagram showing an embodiment related to the detailed structure of the IC card unit 1. The IC card unit 1 is constituted by a PCMCIA interface 13 serving as a system unit interface, an IC card controller 14 for performing control as an IC card unit, a memory 16 connected to the IC card controller 14, and an infrastructure-compatible interface 15 connected to the IC card controller 14. The IC card unit 1 also has a first connector 11 connected to the system unit 3 and a second connector 12 connected to the infrastructure-compatible units 10A to 10N.

Figure 3:
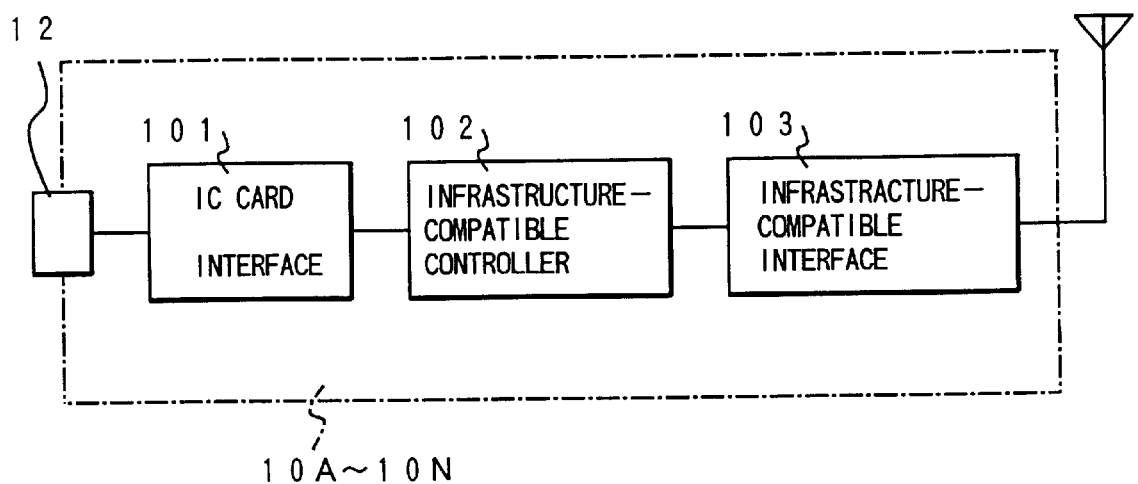
FIG. 3 is a block diagram showing the arrangement of an infrastructure-compatible unit.

FIG. 3 is a block diagram showing the arrangement of the infrastructure-compatible units 10A to 10N for realizing a radio infrastructure interface function to constitute the IC card radio modem 2. Each of the infrastructure-compatible units 10A to 10N is constituted by an IC card interface 101, connected to the IC card unit 1, for returning applied infrastructure type information, an infrastructure-compatible controller 102, and an infrastructure-compatible interface 103 serving as an infrastructure network interface. A radio communication antenna may be commonly used depending on the types of infrastructures.

The operation of the communication system of the present invention using the IC card radio modem 2 will be described below with reference to FIGS. 4 to 7.

The IC card unit 1 and the infrastructure-compatible units 10A to 10N are connected to each other in a one-to-N correspondence by a connecting method such as multipoint or star connection. Whether the plurality of infrastructure-compatible units 10A to 10N are connected can be confirmed by a polling sequence, which is sequentially performed on the basis of a request from the IC card unit 1 (IC card controller 14).

Figure 4:
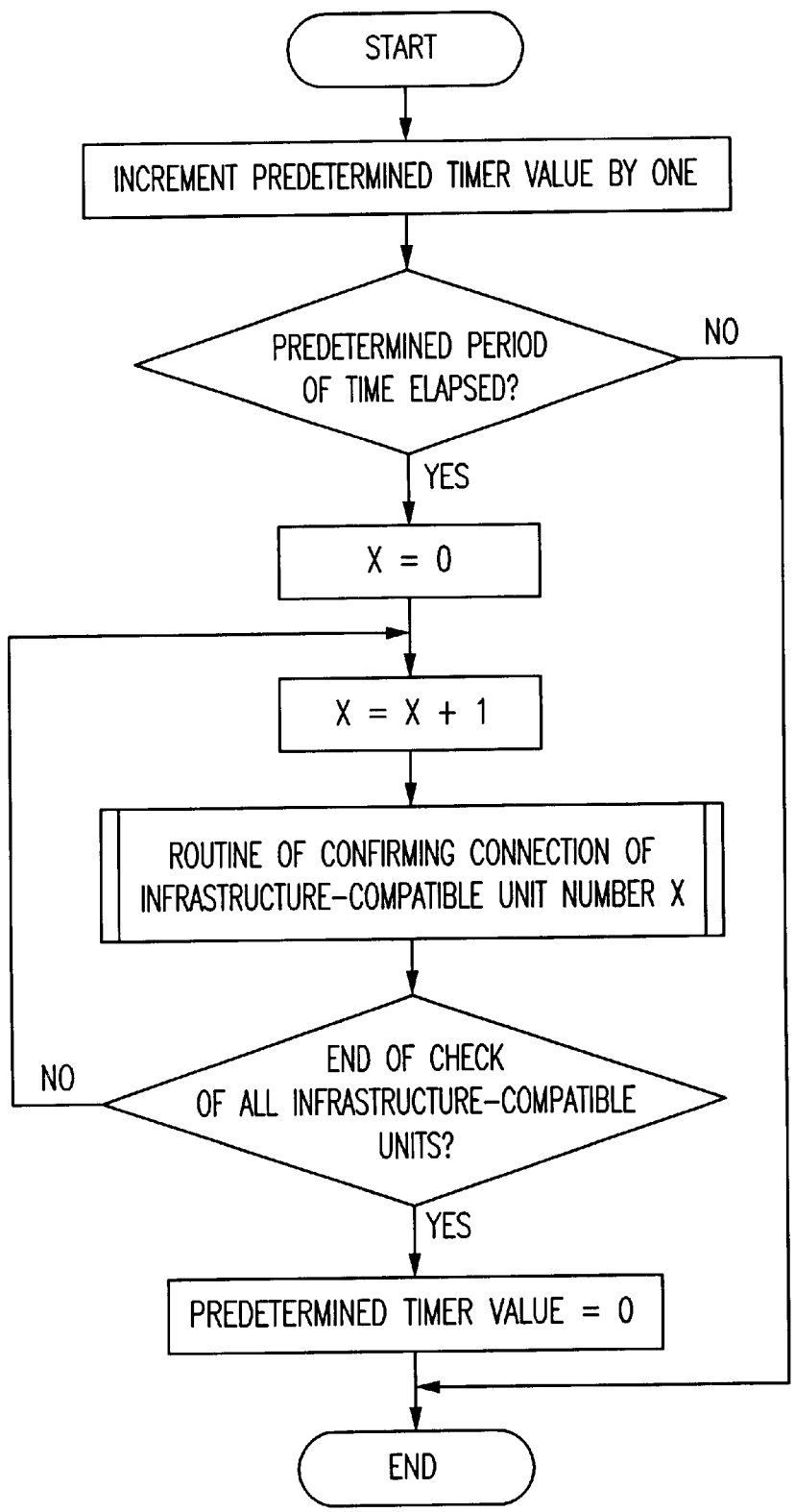
FIG. 4 is a flow chart showing the operation procedures of a polling sequence.

FIG. 4 is a flow chart showing an operation flow related to the polling sequence. In this polling sequence, a confirmation sequence shown in FIG. 5 is sequentially performed for the plurality of infrastructure-compatible units 10A to 10N every predetermined period of time.

Figure 5:
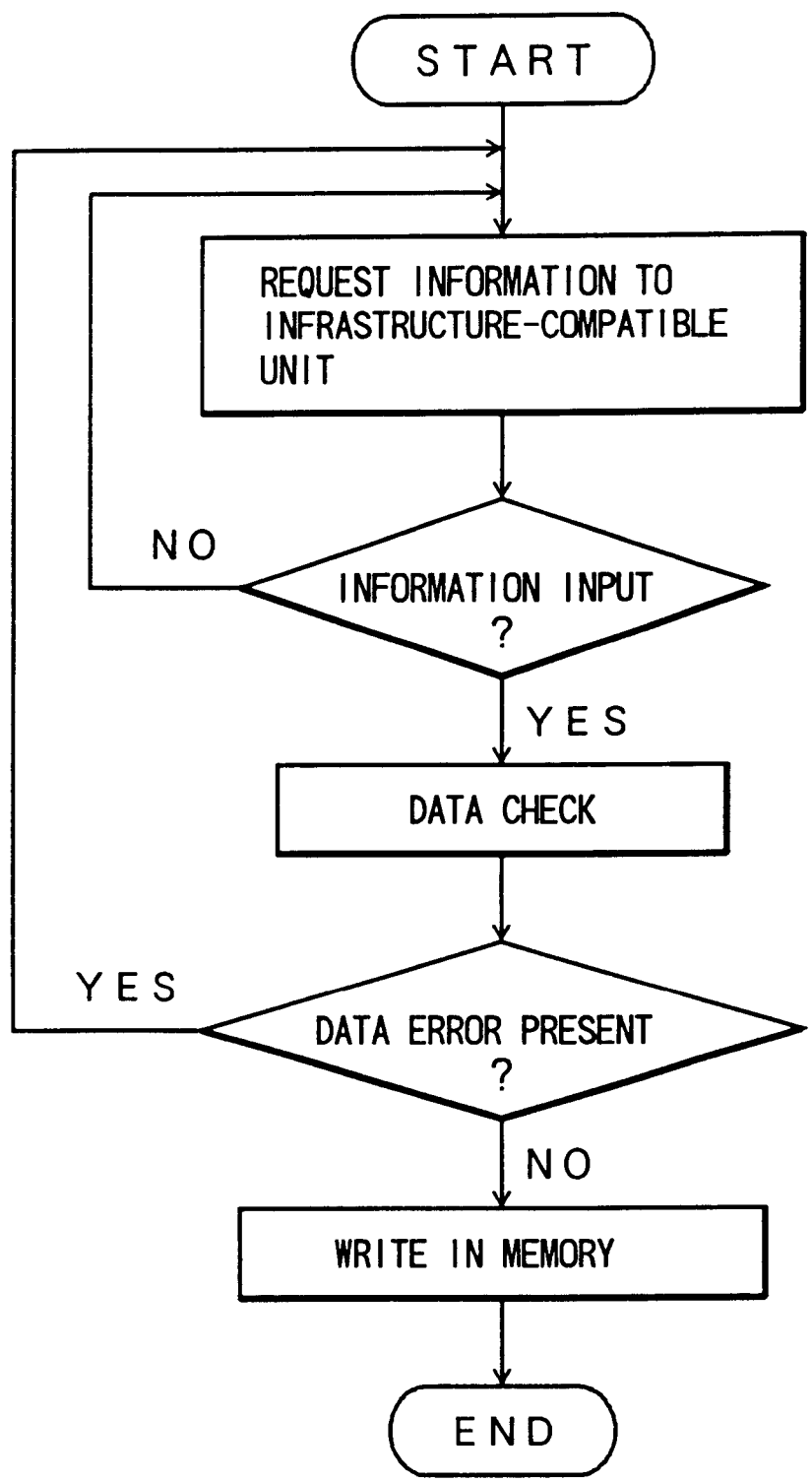
FIG. 5 is a flow chart showing the operation procedures of a confirmation sequence.

In the confirmation sequence shown in FIG. 5, it is confirmed whether the infrastructure-compatible unit connected through the IC card unit 1 in accordance with a command from the system unit 3 is a desired to-be-selected infrastructure-compatible unit. A request is issued to the connected infrastructure-compatible unit to read out information from the IC card unit side. The readout information is checked to confirm the specific type of the connected infrastructure. The confirmation result is stored (memorized) in the memory 16 in accordance with a command from the IC card controller 14 in the IC card unit 1.

Figure 6:
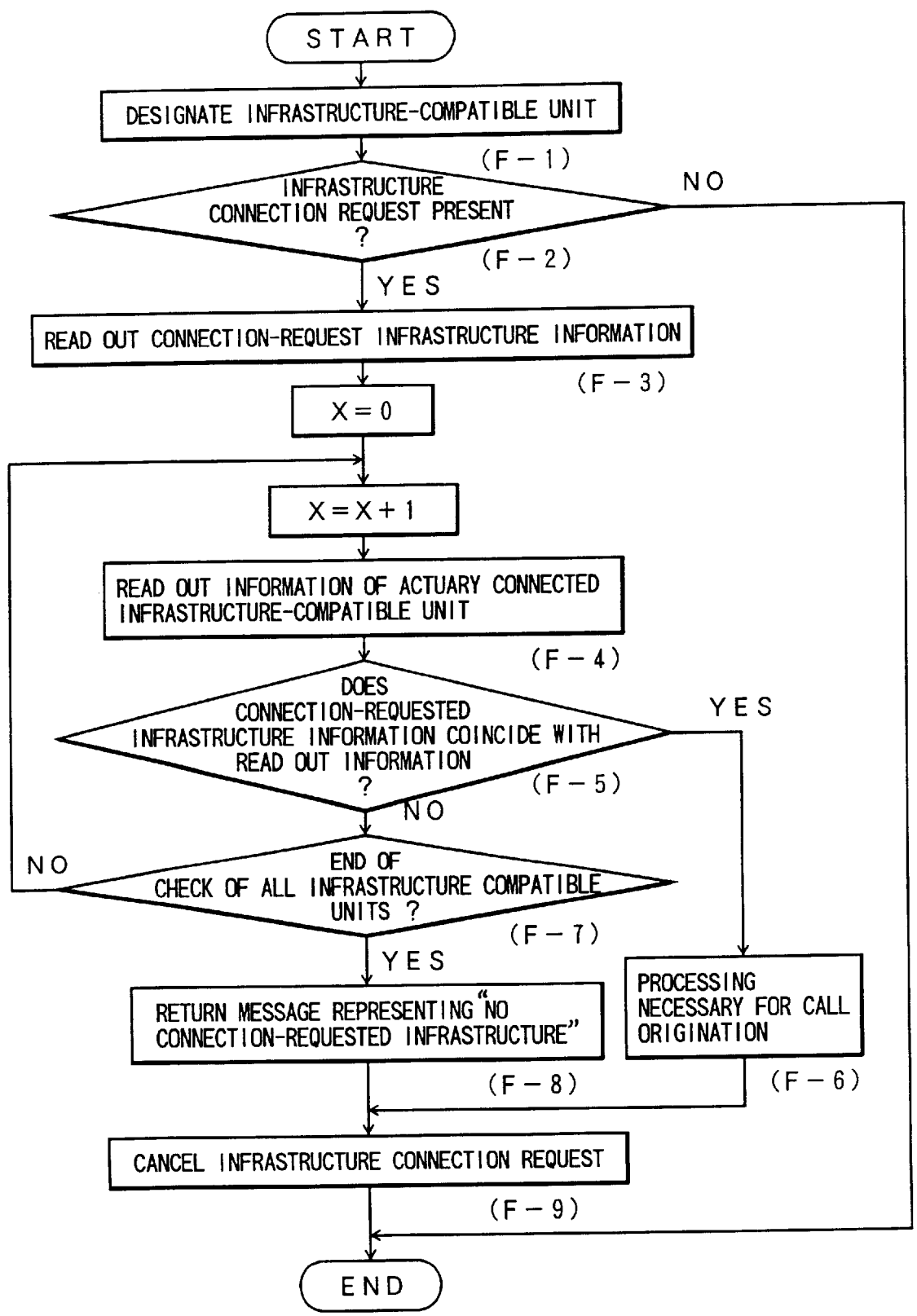
FIG. 6 is a flow chart showing the operation procedures related to designation of the infrastructure-compatible unit.

A method of designating the infrastructure-compatible unit for data communication by the communication system of the present invention will be described below with reference to a flow chart in FIG. 6.

The to-be-used infrastructure-compatible unit, which is made into a general classification such as, for example, a network used for a facsimile or a cellular phone, is designated by the system unit 3 (F-1), and at the same time, a command for a start of data communication is input through the PCMCIA interface 13 (F-2). The IC card controller 14 reads out applied infrastructure information stored in the memory 16 on the basis of the command from the system unit 3 (F-3). The infrastructure information of the actually connected infrastructure-compatible unit is read out (F-4). The readout infrastructure information is compared with the connection-requested infrastructure information which is read out from the memory 16 to check whether these pieces of information coincide with each other (F-5). If YES in step F-5, processes necessary for call origination are performed to realize data communication (F-6). If NO in step F-5, information check for the remaining unconfirmed infrastructure-compatible units is performed, as described in the above polling sequence (F-7). If no information coincident with the infrastructure information read out from the memory is found upon completion of information check related for all the infrastructure-compatible units, a message representing "no connection-requested infrastructure" is output (F-8), thereby canceling the infrastructure connection request (F-9).

Figure 7:
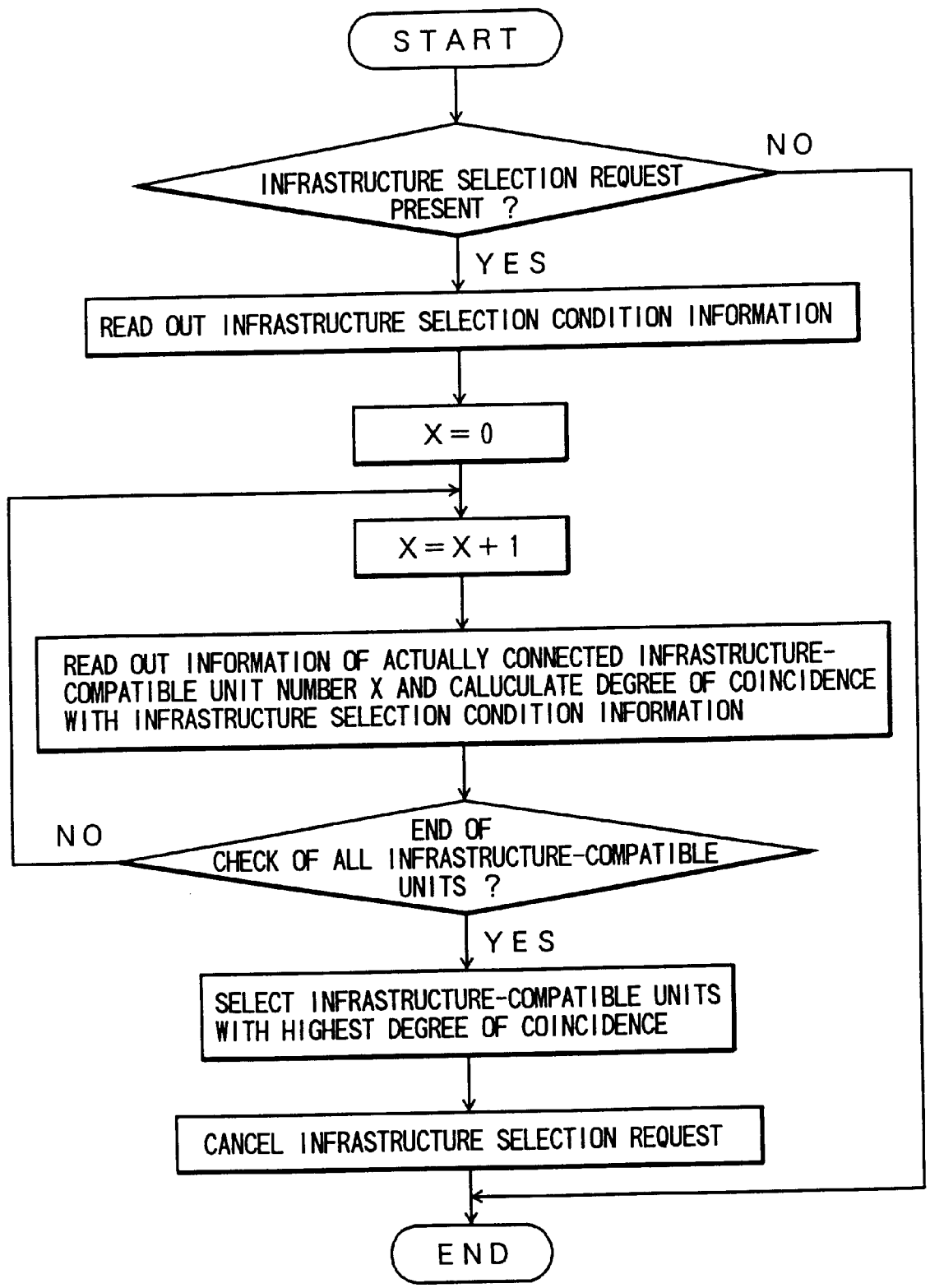
FIG. 7 is a flow chart showing the operation procedures related to selection of the infrastructure-compatible unit.

FIG. 7 is a flow chart showing operation procedures related to selection of the infrastructure-compatible unit to be used for desired data communication.

Assume that no detailed selection of the to-be-used infrastructure is conducted upon reception of a command for data communication from the system unit 3. For example, any group is not selected from the groups of GI to GIV even if a network for a facsimile is designated by the system unit 3 as the to-be-used infrastructure. In this case, a predetermined selection method may be used to select infrastructure characteristics as parameters from pieces of information classified by the types of infrastructures such that an infrastructure which allows data communication at the highest speed is used, or an infrastructure with the lowest data communication fee is used. Alternatively, an initialization value table may be formed in the memory 16 of the IC card unit 1, and an initialization value may be set, thereby selecting an arbitrary infrastructure network by the IC card controller 14 in accordance with the scheme of the set initialization value. Either method can more flexibly cope with the control program of the IC card controller 14.

What is claimed is:

1. An IC card radio modem having a housing and comprising an IC card unit disposed in a slot in said housing, said IC card unit including a PCMCIA interface, an IC card controller connected to said PCMCIA interface for controlling said IC card unit, an infrastructure compatible interface connected to said IC card controller and a memory for storing infrastructure type information corresponding to a plurality of different external infrastructures and for storing a plurality of infrastructure selection criteria in the memory, said memory being connected to said IC card controller, a plurality of infrastructure-compatible units connected at multiple points to said IC card unit through an IC card interface, each of said infrastructure-compatible units being constructed to operate with a respective one of said plurality of different external infrastructures; the IC card controller choosing the one of said infrastructure-compatible units which best meets the infrastructure selection criteria in accordance with one information stored in the memory; and an antenna for sending information communication to a designated one of said external infrastructures corresponding to said designated infrastructure-compatible unit.

2. A modem according to claim 1, wherein each of said plurality of infrastructure-compatible units is constituted by an IC card interface connected to said IC card unit and connection-controlled by predetermined control procedures, an infrastructure-compatible controller connected to said IC card interface, and an infrastructure network-compatible interface connected to said infrastructure-compatible unit.

3. A modem according to claim 1, wherein each of said plurality of infrastructure-compatible units is constituted by an IC card interface connected to said IC card unit and connection-controlled by predetermined control procedures, an infrastructure-compatible controller connected to said IC card interface, and an infrastructure network-compatible interface connected to said infrastructure-compatible unit.

4. A communication system using an IC card radio modem, comprising an IC card unit including a memory for storing infrastructure type information and for storing a plurality of infrastructure selection criteria in the memory, a system unit, connected to said IC card unit through an interface having an interface function based on a PCMCIA standard, for inputting a command related to a start of data communication and designation of a to-be-used infrastructure, and a plurality of infrastructure-compatible units connected to said IC card unit at multiple points through an IC card interface, each of said infrastructure-compatible units being constructed to operate with a respective one of said plurality of different external infrastructures; the IC card unit including means for choosing the one of said infrastructure-compatible units which best meets the infrastructure selection criteria; wherein communication through an arbitrary infrastructure-compatible unit selected from said IC card unit side is allowed.

5. A system according to claim 4, wherein said plurality of infrastructure-compatible units are accommodated in a modem main body incorporating said antenna and having a slot for receiving an IC card unit.

6. A system according to claim 4, wherein said IC card unit is constituted by a PCMCIA interface, an IC card controller, connected to said PCMCIA interface, for controlling said IC card unit, said memory connected to said IC card controller, and an infrastructure-compatible interface connected to said IC card controller.

7. A system according to claim 5, wherein said IC card unit is constituted by a PCMCIA interface, an IC card controller, connected to said PCMCIA interface, for controlling said IC card unit, said memory connected to said IC card controller, and an infrastructure-compatible interface connected to said IC card controller.

8. A system according to claim 4, wherein each of said plurality of infrastructure-compatible units is constituted by an IC card interface connected to said IC card unit and connection-controlled by predetermined control procedures, an infrastructure-compatible controller connected to said IC card interface, and an infrastructure network-compatible interface connected to said infrastructure-compatible unit.

9. A system according to claim 5, wherein each of said plurality of infrastructure-compatible units is constituted by an IC card interface connected to said IC card unit and connection-controlled by predetermined control procedures, an infrastructure-compatible controller connected to said IC card interface, and an infrastructure network-compatible interface connected to said infrastructure-compatible unit.

* * * * *